June 27, 1961 M. G. LEONARD ET AL 2,989,921
CONTROL DEVICES
Filed Nov. 23, 1945 3 Sheets-Sheet 3
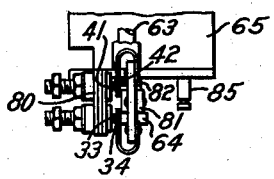
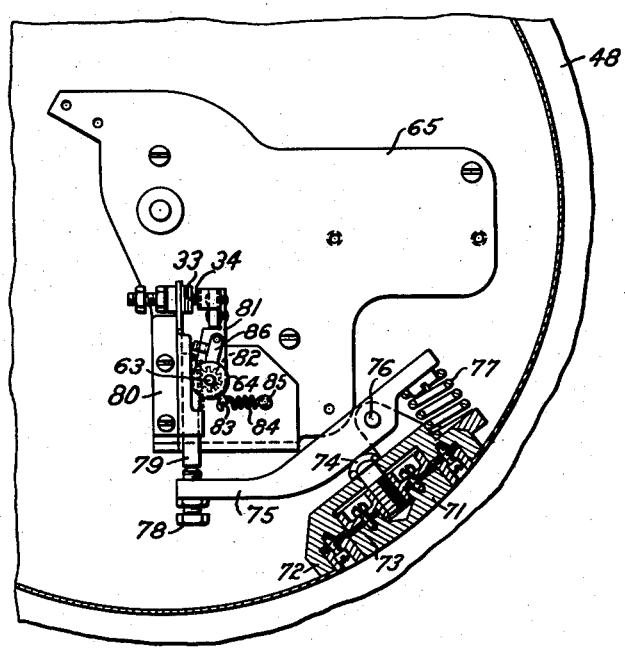
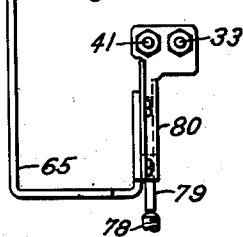
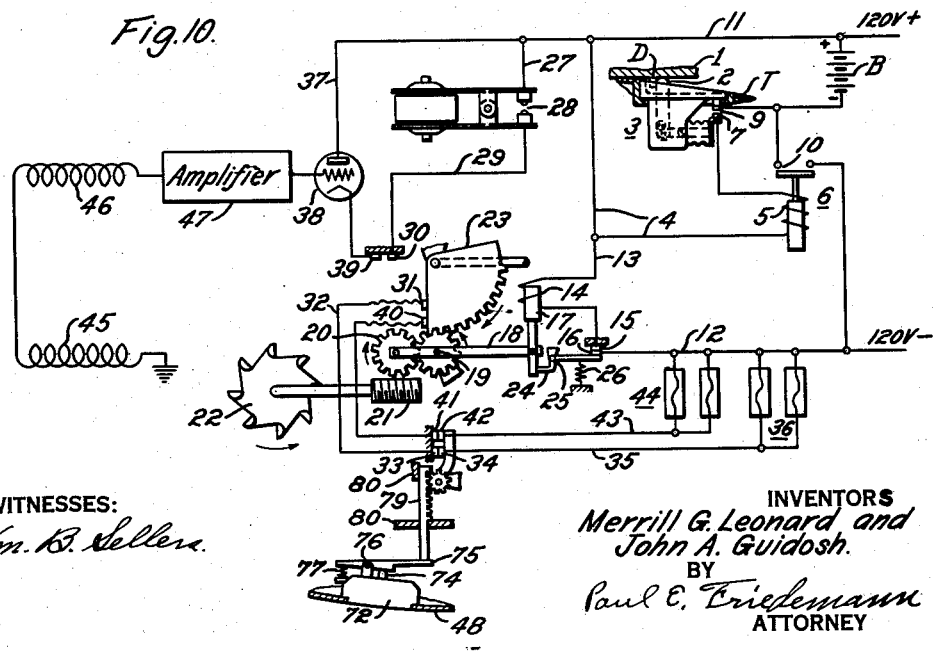
WITNESSES:
Wm. B. Sellers
INVENTORS
Merrill G. Leonard and
John A. Guidosh.
BY
Paul E. Friedemann
ATTORNEY

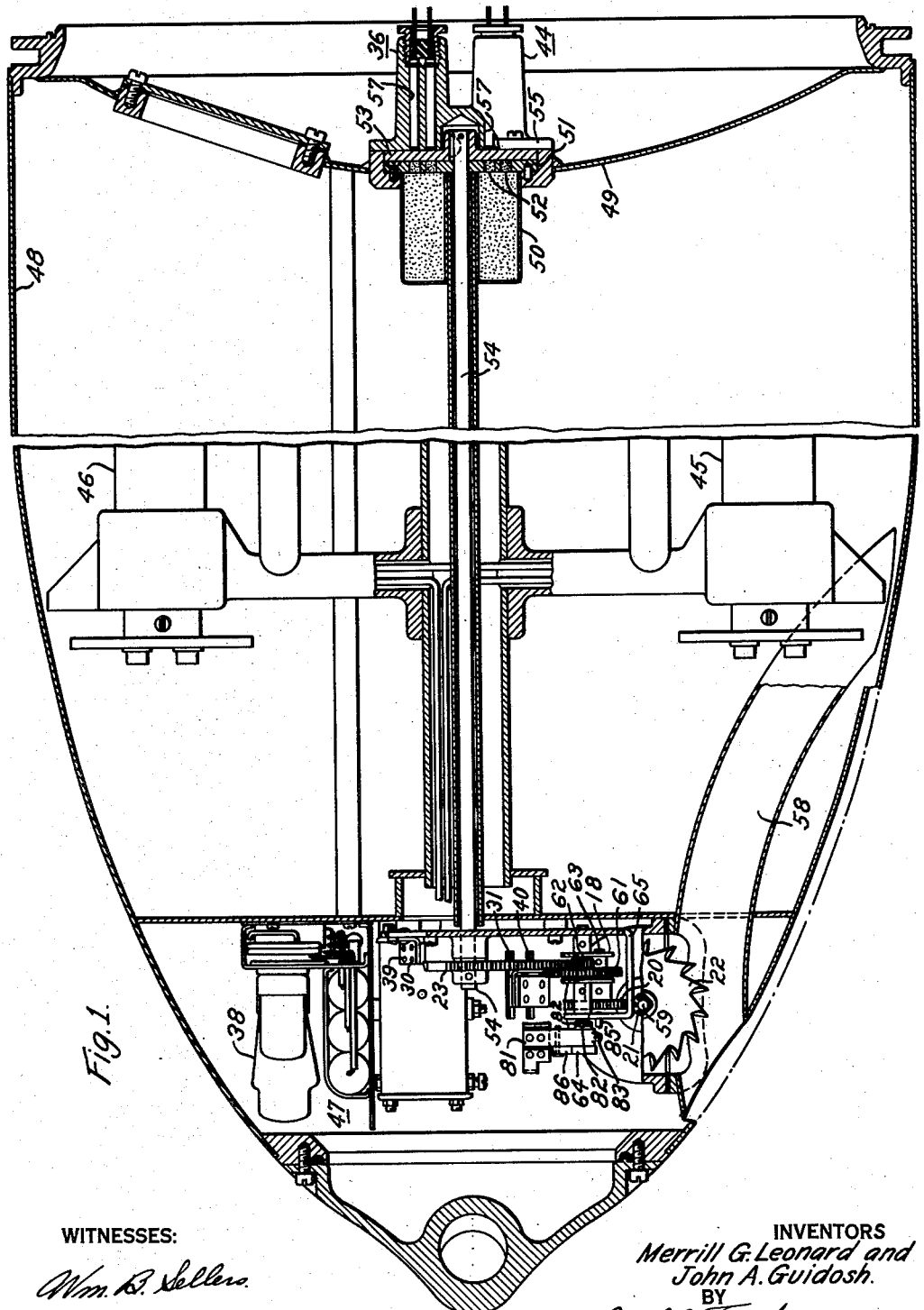

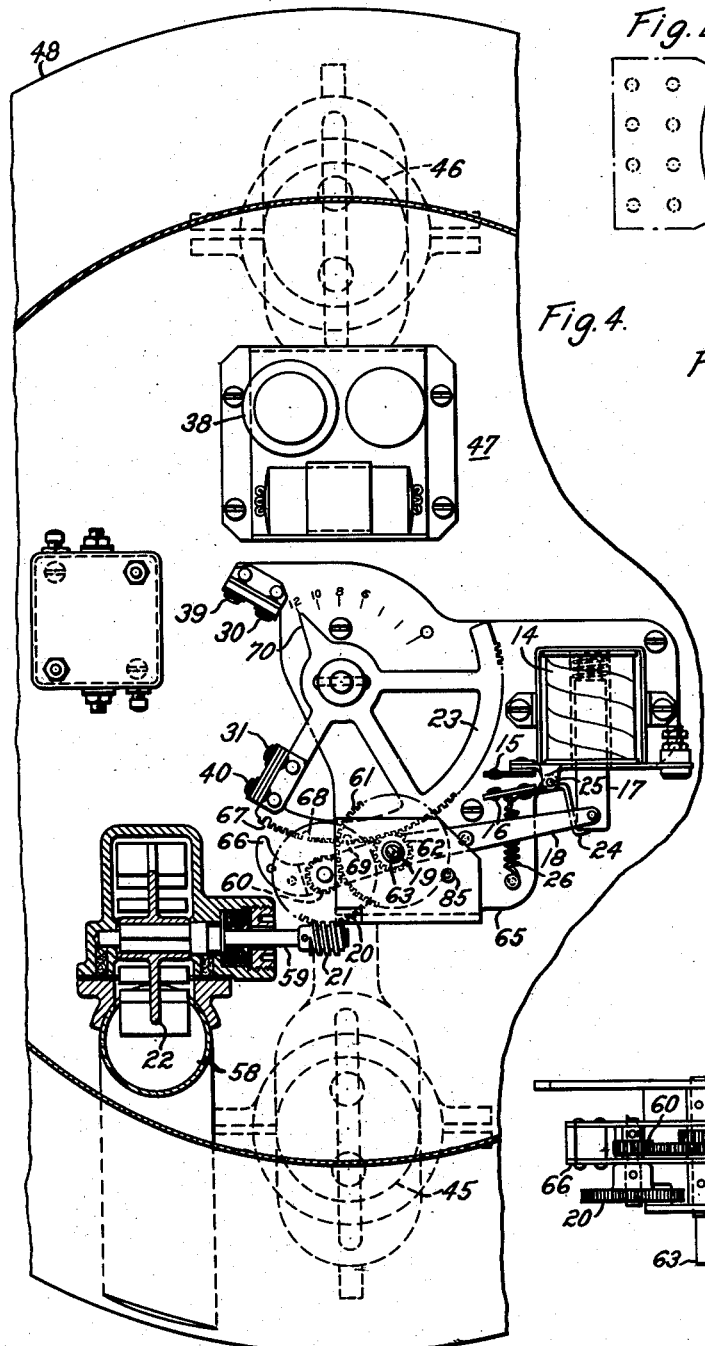
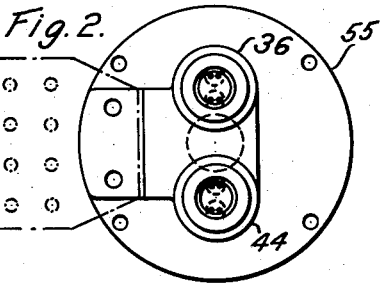
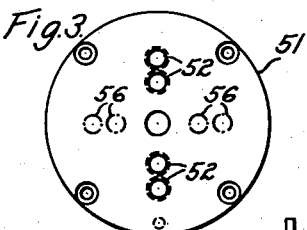
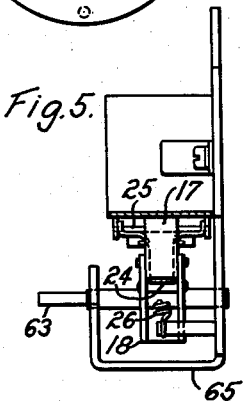
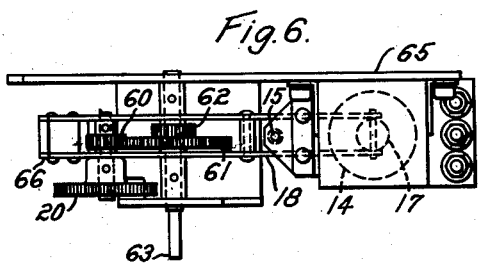

2,989,921
CONTROL DEVICES
Merrill G. Leonard, Sharon, Pa., and John A. Guidosh, Hubbard, Ohio, assignors, by mesne assignments, to the United States of America as represented by the Secretary of the Navy
Filed Nov. 23, 1945, Ser. No. 630,348
9 Claims. (Cl. 102—18)

Our invention relates to torpedoes and more particularly to the war head of a torpedo.

In the operation of torpedoes and other underwater ordnance it is often advantageous to be able to operate the exploder mechanism by proximity of the target in combination with contact or inertia responsive exploder actuating mechanisms.

One broad object of our invention is the provision of a war head for effecting explosion of the main charge by contact devices and proximity devices.

Another object is the provision of the safe handling of a loaded war head having devices responsive to contact devices and devices responsive to a target changing the magnetic gradient of the earth's magnetic field.

A more specific object is the provision of safe arming means responsive to the movement of the torpedo in the water after having been fired.

Another specific object of our invention is the provision of anticountermining devices having a time delay that is a function of the movement of the torpedo through the water.

The objects just stated are merely illustrative. Many other objects and advantages will become apparent from a study of the following specification and the accompanying drawings, in which:

FIGURE 1 is a longitudinal sectional view of our novel war head drawn to smaller scale than following figures;

FIG. 2 is a detail showing the aft end of the detonating squibs;

FIG. 3 is a detail view of a certain element of the arming mechanism;

FIG. 4 is a front view of part of the war head with the nose cut away to shown some of the elements of the arming mechanisms;

FIG. 5 is a detail of the declutching devices as seen from the side;

FIG. 6 is a view of the declutching mechanisms as seen from above;

FIG. 7 is a front view of the anticountermining equipment forming part of our invention;

FIG. 8 is a plan view of some of the elements shown in FIG. 7;

FIG. 9 is a detail view of some of the elements of the anticountermining equipment; and FIG. 10 is a diagrammatic showing of the electric equipment forming a part of our invention.

In order to fire the main charge of explosive filling the war head 48, it is necessary to use booster charges which in our case are mounted at the center of the forward face of the aft bulkhead 49 of the war head. This location has been found the most effective location for detonating the main charge.

The main booster charge consists of a cylindrical cup-shaped container 50 filled with tetryl. At the right, or open, face of this container is mounted a cover plate 51 provided with four tapered openings 52 also filled with tetryl. Just to the right of this cover plate 51 is mounted another plate 53 securely keyed to the center shaft 54. This plate 53 is in surface contact with the plate 51 and with the forward plane surface of the mounting 55 which mounting is provided with suitable channels 57 leading to the igniters of squibs 36 and 44.

The plate 53 is a rotatable baffle plate and is also provided with four openings as 56, filled with tetryl which holes 56 at one position only will register with the openings 52 and the channels 57. Normally, before a war shot is made and the consequent arming operation that is then effected, the plate 53 is in the position shown. Any accidental firing of the squibs 36 and 44 does, therefore, not set up a chain of explosions that can detonate the booster charge in the container 50.

Since the arming of the torpedo is not to take place until the torpedo is well on its way toward the target, we provide means operable by the movement of the torpedo through the water for a selected distance before the baffle plate 53 is rotated sufficiently to effect the registry of the channels 57 and opening 56, and 52.

To effect the arming of the torpedo as a function of the movement of the torpedo through the water we rotatably mount an impeller wheel 22 in the torpedo disposed to be actuated by the flow of water through the channel 58. The bearings for the shaft 59 of the impeller are designed to prevent sea water from leaking into the war head.

Shaft 59 carries the worm 21 which, as shown in FIG. 4, is in mesh with worm wheel 20. The shaft carrying worm wheel 20 carries the small pinion 60 meshing with the spur gear 61. The shaft 63 carrying spur gear 61 also carries the pinion 62 meshing with the teeth on the gear sector 23. The shaft 63, carrying the pin 62 and spur gear 61, also carries a drum 64 which rotates in a counterclockwise direction, as seen in FIG. 7, during the entire run of the torpedo. The purpose of this drum will become clear hereinafter.

The gear sector 23 is keyed to the center shaft 54 so that the position of the gear sector determines the position of the holes 56 in the baffle plate 53 with reference to the holes 52 and channels 57.

A lever 18 is disposed to pivot at 19 on frame 65 which is a common pivot for shaft 63. The pinion 60 and worm wheel 20 is carried nearer the left end of this lever 18 and the disposition of the shaft carrying the pinion 60 and worm wheel 20 is such that angular movement of lever 18 does not alter the inmesh condition of the pinion 60 and spur gear 61.

The left end of lever 18, as seen in FIG. 4, is provided with an upward projection 66 which is so disposed that, when lever 18 is in its extreme clockwise position, the projection engages one of the notches 67, 68, or 69 depending on the adjustment of the sector 23.

When notch 67 is engaged the sector 23 is in such a position that substantially twelve seconds after firing transpire before arming is effected. To adjust the length of time for arming, the sector 23 may be turned until the pointer 70 registers with one of the graduations shown. When pointer 70 registers with the twelve-seconds graduation a full turn of 90° of the sector 23 is required to effect arming. A lesser angular turn is, of course, required if the sector 23 is initially set so that end 66 engages with the notch 68 or 69.

Before firing of the torpedo the lever 18 is in its clockwise position with the armature 17 down and the latch 24 engaging the left side of the armature 17. Since such position of the latch closes contacts 15 and 16 which are in the circuit for the solenoid coil 14 it is apparent that energization of leads 11 and 12 energizes solenoid 14. When coil 14 is energized and the armature actuated, the parts take the position shown in FIG. 4.

The clutching and declutching feature effected by the solenoid operated lever 18 adds considerably to the safety of the equipment. Normally, before firing, the worm 21 is not in mesh with worm wheel 20. The impeller wheel can thus be operated to any extent without effecting any arming operation. Such operation of the impeller wheel 22 would undoubtedly take place when the torpedo is carried in an open tube where the water splashing and swirling around the head produces the operating force.

The impeller wheel would also be operated by the air streaming through the channel 58 when the torpedo is carried either on a plane or on the deck of a boat designed for launching torpedoes from the deck.

When the arming operation is completed the contact 31 moves in engagement with contact 30, and the contact 40 moves in engagement with contact 39 effecting the partial establishment of two firing circuits. The circuits are apparent from FIG. 10 and the discussion of FIG. 10.

It is quite essential that the countermining measures do not set off the charge but that the charge be set off only by either the operation of the inertia responsive contacts 28 or by the firing of the electronic discharge tube responsive to the magnetic gradient responsive equipment designated by the coils 45 and 46 and the amplifier 47.

The anticountermining feature includes a plunger 71 disposed flush with front side portion of the war head. This plunger 71 is freely movable in a fitting 72 having a diaphragm 73 secured in the fitting 72 and to the plunger 71. The inner side of the plunger carries a round-headed bolt 74 engaging the lever 75 to the left of the pivot 76 for the lever. A compression spring 77 is disposed as shown in FIG. 7 to bias the lever 75 in a counterclockwise direction by a selected force.

An adjustable bolt 78 is secured to the left end of lever 75 and engages the bottom end of a rack 79 disposed for vertically slidable movement in the frame 80 bolted to the frame 65.

A contact arm 81 having a sleeve-like pivot is rotatably mounted on shaft 63. An annular projection on the sleeve-like pivot carries a pinion 82 meshing with the teeth on rack 79. The contact arm 81 has a projection 83 at the lower right side engaging one end of the tension spring 84, which spring at its other end is secured to a pin 85 on frame 80. The arm 81 is thus biased to counterclockwise rotation to normally hold contacts 33 and 34 in engagement and contacts 41 and 42 in engagement.

When some countermining operation actuates plunger 71 the rack 79 is moved vertically upward to move lever 81 clockwise to interrupt the circuits at the contacts 33 and 34, and 41 and 42. It is quite desirable that this circuit interruption be not too transient but that the circuits at the contacts 33 and 34 and 41 and 42 remain open for a selected time interval.

To accomplish this time delay we pivotally mount on contact arm 81 the depending clutch jaw 86. This jaw in the position shown rides freely on the drum 64 continuously rotating at a relatively slow speed in the counterclockwise direction.

When the contact arm 81 is actuated clockwise the jaw 86 rides over the drum surface in a clockwise direction but when the spring 84 starts to rotate the arm 81 counterclockwise the jaw 86 engages the drum 64. Since the jaw is so positioned and designed that it cannot move to an overcenter position, the arm 81 can move counterclockwise only at a speed determined by the counterclockwise speed of the drum 64.

A still better understanding can be had of our invention from a study of the sequence of operation of the electric circuit elements.

Upon firing, or launching, of the torpedo T the dog D on the firing tube or base 1 actuates the lever 2 of the trigger switch 3 whereupon the contacts 7 and 9 are caused to engage. A circuit is, therefore, established from the positive terminal of the battery B through the conductors 11 and 4, actuating coil 5 of the main contactor 6, contacts 7 and 9 to the negative terminal of the battery B. Operation of contactor 6 closes the contacts 10 thereby connecting the leads 11 and 12 directly across the battery. The propulsion motor and other electric control units are connected across these leads and also the electric units entering into the inventions herein presented are connected across the leads 11 and 12.

When leads 11 and 12 become energized a circuit is established from the positive lead 11 through conductors 4 and 13, solenoid coil 14, contacts 15 and 16 to lead 12. The armature 17 is thus moved up to its extreme upper position and in doing so the lever 18 pivoted at 19 moves the worm wheel 20 down to engage the worm 21. The worm 21 being driven by the impeller wheel 22, and through the reduction gears shown, operates the gear sector 23 in the direction indicated.

Movement of the armature 17 to its extreme upper position releases the latch 24 pivoted at 25. The other end of the latch carries the contacts 16 in the circuit of the actuating coil 14. The biasing spring 26 moves the contacts 16 out of engagement of contact 15 to thus de-energize the coil, or solenoid 14. However, since the latch 24 moves to the position shown in FIG. 4 the armature 17 remains in its upper position to thus maintain the meshing engagement between the worm 21 and worm wheel 20. The coaction of gear sector 23 thus continues even though coil 14 is de-energized.

When the gear sector has been moved through 90° the arming is complete, namely the openings 56 in the baffle plate 53 register with the channels 57 and the tapered openings 52 in the plate 51. Also when this sector movement is completed the pinion rides on the cut-away gearless portion of the sector 23 so that any further movement of the impeller does no longer operate the gear sector 23.

As the gear sector 23 moves to its full arming position contact 31 moves into engagement with contact 30 so that detonation of squib 36, including two separate igniters connected in parallel, may be effected provided the inertia responsive contacts 28 are closed and provided the anticountermining contacts 33 and 34 are at the time in engagement. This detonating circuit, when completed, extends from the positively energized lead 11 through conductor 27, contacts 28, conductor 29, contacts 30 and 31, conductor 32, contacts 33 and 34, conductor 35 and the igniters of the detonator 36 to the negatively energized lead 12.

As the gear sector 23 moves to the full arming position contact 40 engages contact 39 so that detonation of the squib 44, including two separate igniters connected in parallel, may be effected provided the magnetically controlled discharge tube 38 is conducting and contacts 41 and 42, of the anticountermining equipment, are at the time in engagement. This detonating circuit, when completed, extends from lead 11 through conductor 37, electric discharge tube 38, contacts 39 and 40, contacts 41 and 42, conductor 43, and the two parallelly connected igniters of the squib 44 to the negatively energized lead 12.

The magnetically controlled detonator circuit shows the magnetic gradient responsive element in simplified form including a pair of coils 45 and 46 responsive to the magnetic gradient in the proximity of the torpedo, an amplifier 47, and an electronic discharge device 38 fired upon a predetermined change of current in the coils 45 and 46. The actual construction of this proximity type detonator is more complex than here indicated but since this detonator control per se is no part of the present invention the showing herein suffices. For a more detailed discussion of the apparatus responsive to magnetic gradient, reference may be had to the copending application of Lewis W. Chubb, Sidney Siegel and Herbert L. Prescott, Serial No. 586,874, filed April 6, 1945, and entitled Control Device.

While we have shown but one system of control and one arrangement of mechanical elements, we do not wish to be limited to the particular showing made but wish to be limited only by the scope of the claims hereto appended.

We claim as our invention:

1. In a torpedo, in combination, a war head substantially filled with a charge of explosive, a source of electric energy, a pair of electrically operable squibs for detonating the charge of explosive, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in an other position, flow stream actuated means operable as a function of the distance of travel of the torpedo in the sea for actuating the baffle plate, clutching means operable at the time the torpedo is fired for clutching said flow stream actuated means to the baffle plate to thus operate the baffle plate to the arming position, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, and means operable by said flow stream actuated means for making the inertia means and the magnetically actuated means effective only after the baffle plate has moved to its arming position.

2. In a torpedo, in combination, a war head containing a charge of explosive, a source of electric energy, a pair of electrically operable squibs for detonating the charge of explosive, circuits for said squibs, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in any other position, flow stream actuated means operable as a function of the distance of travel of the torpedo in the sea for actuating the baffle plate, clutching means operable at the time the torpedo is fired for clutching said flow stream actuated means to the baffle plate to thus operate the baffle plate to the arming position, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, anticountermining means responsive to countermining action for interrupting the circuits to the squibs to thus prevent the establishment of closed circuits to the respective squibs by the inertia means and the magnetically actuated means, and means operable by said flow stream actuated means for making the inertia means and the magnetically actuated means effective only after the baffle plate has moved to its arming position.

3. In a torpedo, in combination, a war head containing a charge of explosive, a source of electric energy, a pair of electrically operable squibs for detonating the charge of explosive, circuits for said squibs, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in any other position, flow stream actuated means operable as a function of the distance of travel of the torpedo in the sea for actuating the baffle plate, clutching means operable at the time the torpedo is fired for clutching said flow stream actuated means to the baffle plate to thus operate the baffle plate to the arming position, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, anticountermining means responsive to countermining action for interrupting the circuits to the squibs to thus prevent the establishment of closed circuits to the respective squibs by the inertia means and the magnetically actuated means, means operable by the flow stream actuated means for continuing the operating effect of the anticountermining means for a selected interval of time, and means operable by said flow stream actuated means for making the inertia means and the magnetically actuated means effective only after the baffle plate has moved to its arming position.

4. In a torpedo, in combination, a war head containing a charge of explosive, a source of electric energy, a pair of electrically operable squibs for detonating the charge of explosive, circuits for said squibs, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in any other position, flow stream actuated means operable as a function of the distance of travel of the torpedo in the sea for actuating the baffle plate, means operable to adjust the initial position of the baffle plate with reference to its arming position so that the movement of the baffle plate to its arming position takes place at any selected distance of the torpedo from its firing position, clutching means operable at the time the torpedo is fired for clutching said flow stream actuated means to the baffle plate to thus operate the baffle plate to the arming position, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, and means operable by said flow stream actuated means for making the inertia means and the magnetically actuated means effective only after the baffle plate has moved to its arming position.

5. In a torpedo, in combination, a war head containing a charge of explosive, a source of electric energy, a pair of electrically operable squibs for detonating the charge of explosive, electric circuits for said squibs, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in any other position, flow stream actuated means operable as a function of the distance of travel of the torpedo in the sea for actuating the baffle plate, means operable to adjust the initial position of the baffle plate with reference to its arming position so that the movement of the baffle plate to its arming position takes place at any selected distance of the torpedo from its firing position, clutching means operable at the time the torpedo is fired for clutching said flow stream actuated means to the baffle plate to thus operate the baffle plate to the arming position, inertia means operable upon contact of the torpedo with the target to connect one squib to the source of electric energy to thus effect detonation of the charge of explosive in the warhead, magnetically actuated means responsive to the proximity of the target to the torpedo to connect the other squib to the source of electric energy to thus effect detonation of the charge of explosive in the war head, anticountermining means responsive to countermining action for interrupting the circuits to the squibs to thus prevent the establishment of closed circuits to the respective squibs by the inertia means and the magnetically actuated means, and means operable by said flow stream actuated means for making the inertia means and the magnetically actuated means effective only after the baffle plate has moved to its arming position.

6. In a torpedo, in combination, a war head containing a charge of explosive, a source of electric energy, a pair of electrically operable squibs for detonating the charge of explosive, electric circuits for said squibs, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in any other position, flow stream actuated means operable as a function of the distance of travel of the torpedo in the sea for actuating the baffle plate, means operable to adjust the initial position of the baffle plate with reference to its arming position so that the movement of the baffle plate to its arming position takes place at any selected distance of the torpedo from its firing position, clutching means operable at the time the torpedo is fired for clutching said flow stream actuated means to the baffle plate to thus operate the baffle plate to the arming position, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, anticountermining means responsive to countermining action for interrupting the circuits to the squibs to thus prevent the establishment of closed circuits to the respective squibs by the inertia means and the magnetically actuated means, means operable by the flow stream actuated means for continuing the operating effect of the anticountermining means for a selected interval of time, and means operable by said flow stream actuated means for making the inertia means and the magnetically actuated means effective only after the baffle plate has moved to its arming position.

7. In a torpedo, in combination, a war head containing a charge of explosive, a source of electric energy, a pair of electrically operable squibs for detonating the charge of explosive, electric circuits for the squibs, a rotatable baffle plate disposed between the charge and the squibs, said baffle plate having an opening which plate, when in one position only, namely, the arming position, admits the explosive effect of the squibs to the charge of explosive in the war head but which effectively shields the explosive charge from the explosive effect of the squibs when in any other position, flow stream actuated means operable as a function of the distance of travel of the torpedo in the sea for actuating the baffle plate, means operable to adjust the initial position of the baffle plate with reference to its arming position so that the movement of the baffle plate to its arming position takes place at any selected distance of the torpedo from its firing position, clutching means operable at the time the torpedo is fired for clutching said flow stream actuated means to the baffle plate to thus operate the baffle plate to the arming position, said clutching means having locking means for locking the baffle plate in the position to which it is adjusted as long as the clutching means has not been actuated to couple the flow stream actuated means to the baffle plate, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, and means operable by said flow stream actuated means for making the inertia means and the magnetically actuated means effective only after the baffle plate has moved to its arming position.

8. In a torpedo, in combination, a war head containing a charge of explosive, a source of electric energy, a pair of electrically operable squibs for detonating the charge of explosive, electric circuits for the squibs, a rotatable baffle plate disposed between the charge and the squibs, said baffle plate having an opening which plate, when in one position only, namely, the arming position, admits the explosive effect of the squibs through said opening to the charge of explosive in the war head but which effectively shields the explosive charge from the explosive effect of the squibs when in any other position, flow stream actuated means operable as a function of the distance of travel of the torpedo in the sea for actuating the baffle plate, means operable to adjust the initial position of the baffle plate with reference to its arming position so that the movement of the baffle plate to its arming position takes place at any selected distance of the torpedo from its firing position, clutching means operable at the time the torpedo is fired for clutching said flow stream actuated means to the baffle plate to thus operate the baffle plate to the arming position, said clutching means having locking means for locking the baffle plate in the position to which it is adjusted as long as the clutching means has not been actuated to couple the flow stream actuated means to the baffle plate, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, anticountermining means responsive to countermining action for interrupting the circuits to the squibs to thus prevent the establishment of closed circuits to the respective squibs by the inertia means and the magnetically actuated means, and means operable by said flow stream actuated means for making the inertia means and the magnetically actuated means effective only after the baffle plate has moved to its arming position.

9. In a torpedo, in combination, a war head containing a charge of explosive, a source of electric energy, a pair of electrically operable squibs for detonating the charge of explosive, electric circuits for the squibs, a rotatable baffle plate disposed between the charge and the squibs, said baffle plate having an opening which plate, when in one position only, namely, the arming position, admits the explosive effect of the squibs through the opening to the charge of explosive in the war head but which effectively shields the explosive charge from the explosive effect of the squibs when in any other position, flow stream actuated means operable as a function of the distance of travel of the torpedo in the sea for actuating the baffle plate, means operable to adjust the initial position of the baffle plate with reference to its arming position so that the movement of the baffle plate to its arming position takes place at any selected distance of the torpedo from its firing position, clutching means operable at the time the torpedo is fired for clutching said flow stream actuated means to the baffle plate to thus operate the baffle plate to the arming position, said clutching means having locking means for locking the baffle plate in the position to which it is adjusted as long as the clutching means has not been actuated to couple the flow stream actuated means to the baffle plate, inertia means operable upon contact of the torpedo with the target to connect one squib to the source of electric energy to thus effect detonation of the charge of explosive in the war head, magnetically actuated means responsive to the proximity of the target to the torpedo to connect the other squib to the source of electric energy to thus effect detonation of the charge of explosive in the war head, anticountermining means responsive to countermining action for interrupting the circuits to the squibs to thus prevent the establishment of closed circuits to the respective squibs by the inertia means and the magnetically actuated means, means operable by the flow stream actuated means for continuing the operating effect of the anticountermining means for a selected interval of time, and means operable by said flow stream actuated means for making the inertia means and the magnetically actuated means effective only after the baffle plate has moved to its arming position.

No references cited.